F. L. JEFFERIES.
STEEPING APPARATUS.
APPLICATION FILED FEB. 6, 1911.
1,007,783.
Patented Nov. 7, 1911.
2 SHEETS—SHEET 1.
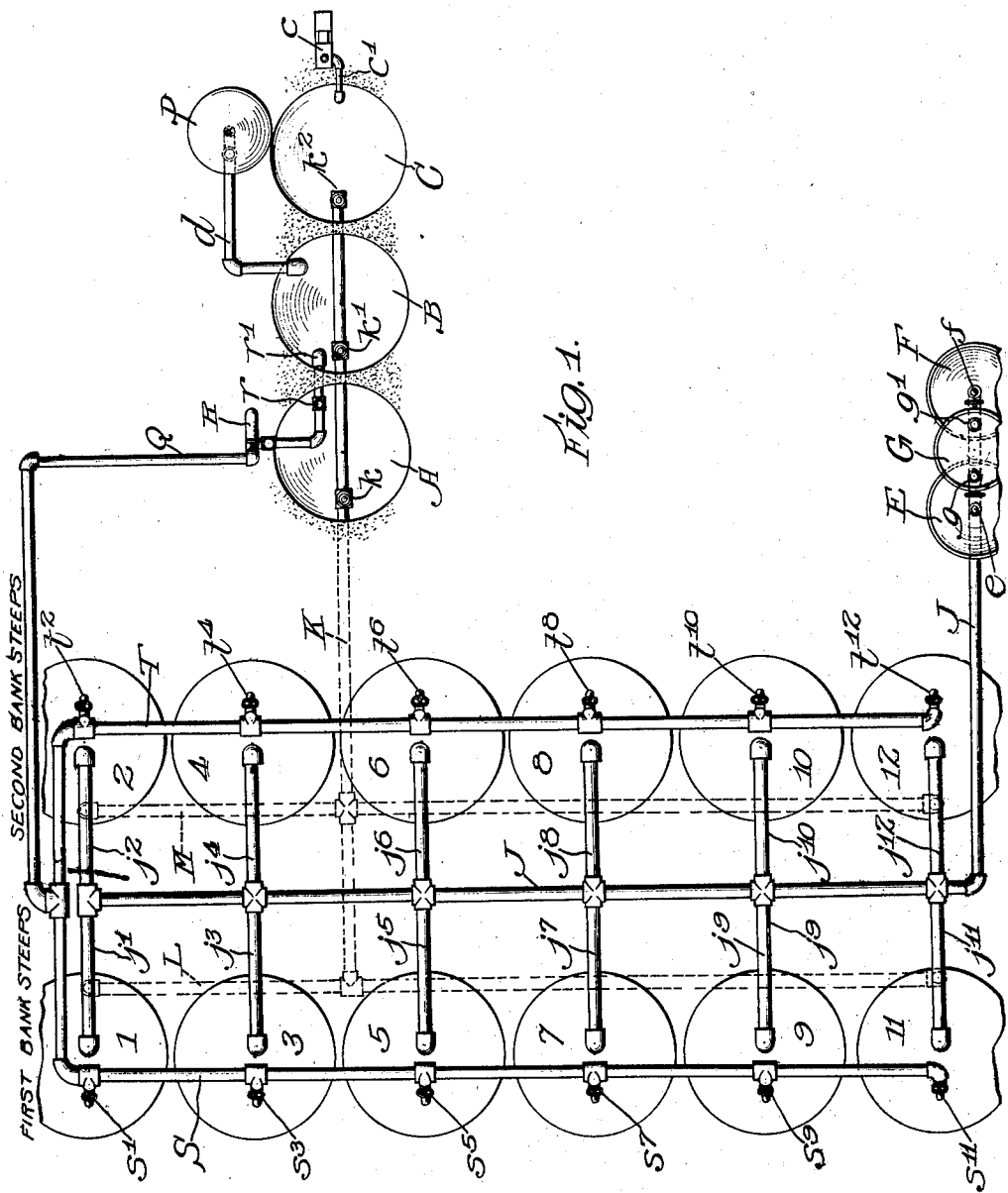

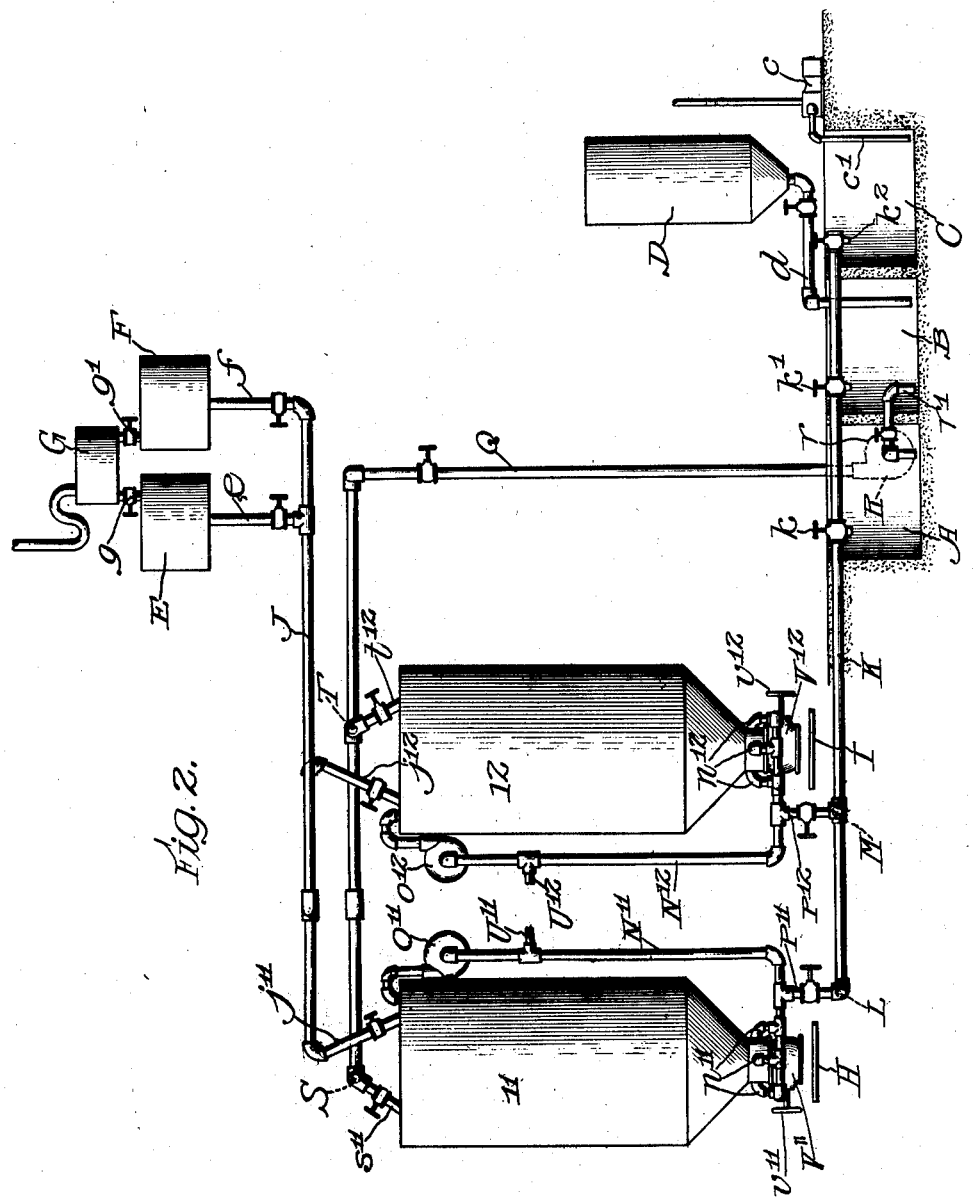

UNITED STATES PATENT OFFICE.

FREDRICK LESTER JEFFERIES, OF GRANITE CITY, ILLINOIS, ASSIGNOR TO CORN PRODUCTS REFINING COMPANY, A CORPORATION OF NEW JERSEY.

STEEPING APPARATUS.

1,007,783.  Specification of Letters Patent.  Patented Nov. 7, 1911.

Application filed February 6, 1911. Serial No. 606,894.

*To all whom it may concern:*

Be it known that I, FREDRICK L. JEFFERIES, a citizen of the United States, residing at Granite City, in the county of Madison and State of Illinois, have invented certain new and useful Improvements in Steeping Apparatus, of which the following is a specification.

My invention relates to apparatus suitable particularly for steeping grain in the manufacture of starch from corn; and the invention has for its object to provide certain new and improved arrangements and devices in apparatus of this character.

The familiar manner of steeping grain, in order to soften it before it goes to the mills and extract therefrom certain soluble substances which are valuable as by-products, is to introduce the steeping liquid, ordinarily a dilute sulfurous acid, into the steep tanks containing the grain and allow it to remain in contact with the grain until the latter has been rendered sufficiently soft, whereupon it is withdrawn and sent to the evaporators. This method is objectionable because in the first place a large proportion of the soluble substances are not removed from the corn and are consequently lost. Furthermore, the steeping being carried on entirely in batches the grain is not likely to be uniformly steeped. In addition the steep water which goes to the evaporators is so dilute as to make the work of recovery of the solid substances expensive. Finally the process requires a great deal of water, a comparatively large number of steep tanks, and consumes a very considerable amount of time. With a view to obviating these objections a system of steeping has been devised in which the steeping liquid is run in a continuously flowing stream, at a slow rate of speed, through a serious of steeps which are one by one cut out of the circulatory system, emptied of their grain, refilled with fresh grain, and thereupon cut into the system again; the flow of the liquid through the steeps being so directed that when introduced it flows first through the longest steeped corn, then to the next fresher body, and so on until it is withdrawn out of the system from the tank containing the last batch of fresh corn added.

The present invention provides a novel form of steeping apparatus in which the steep water instead of being kept for the whole steeping period on one body of corn, as was the case under the old system, is passed through the steeps successively. In this regard it follows the method of the continuous system which has been recently devised, as above described. The system of the present invention, however, instead of employing a stream of steep water flowing continuously from one steep directly into the next from one end of the battery to the other, fills the steeps successively with separate bodies of steep water, allows such bodies of liquid to stand for some considerable period of time on the bodies of corn with which they are thus brought into contact, and periodically shifts these bodies of liquid from one steep to the other, draining the liquid completely out of the steeps, in each case, before the new liquid is introduced therein. With apparatus which has the capacity for operation in this manner, separate circulations may be set up in each individual steep during the periods of time in which a given body of liquid remains in such steep, these separate circulations tending to thoroughly agitate the corn and bringing the water in intimate contact with every kernel thereof. Moreover, the apparatus, for a steeping system operating according to this plan, may be comparatively simple and economical in its construction.

One of the primary objects of the invention, therefore, is to provide apparatus suitable for carrying on the steeping operation on the plan above outlined.

A further subsidiary object of the invention is to provide a form of apparatus in which the battery of steeps may be divided, if desirable, into a plurality of separate banks or series of steeps, the steeps of the separate banks or series being so connected, among themselves, with the source of supply of steep water and with the instrumentalities for making the changes from one steep to another, that the changes of liquid from one steep to another may be made entirely as between the several steeps of the separate banks, for example, so that the shifts can be made first in one bank and then in the other. This is desirable in the case of a large installation because if the water had to be changed from every steep to the next one throughout the whole series, the steeps which are necessarily out for the purpose of grinding and refilling would remain out for an unnecessarily long interval at each cycle and time would therefore be wasted.

The invention has for further objects such other new and improved arrangements and devices in apparatus for removing the soluble substances from materials and for concentrating the derived liquor, as will be hereinafter more fully described and claimed.

The invention is shown, somewhat diagrammatically in a preferred form of apparatus, in the accompanying drawings wherein—

Figure 1 is a plan view, and Fig. 2, an end elevation with certain parts shown in section.

Like characters of reference indicate like parts in both figures of the drawings.

Referring to the drawings, 1 to 12 inclusive designate a battery of steep tanks of any suitable familiar construction the battery being preferably divided into two banks of six tanks each with the odd numbered tanks in one bank and the even numbered in the other.

A and B designate two change cisterns; C a discharge tank in which the concentrated liquor is received, and D a wash water tank, which will be used in the event that the steeped grain is to be washed before it goes to the mills. This is not necessary under all circumstances.

E and F designate sulfur tanks supplied from a tank G having valved discharge pipes $g$, $g'$.

H and I designate conveyers, which are conventionally represented, and are located under, respectively, the two banks of steep tanks, these conveyers being adapted to carry off the steeped grain to the mills. The odd numbered steeps will be referred to as the first bank and the even numbered steeps as the second bank.

The sulfur water, or other suitable steeping liquid, is conducted from the tanks E or F through branch pipes $e$, $f$ and a pipe J having valved branches $j'$, $j^2$, et cetera, discharging into the several steep tanks respectively. A pipe K having the two feeders L and M for respectively the first and second bank of steeps conducts the liquor from the steeps to either one of the change cisterns A and B, or to the discharge tank C, as may be desired; the pipe K being provided with the discharge nozzles $k$, $k'$, $k^2$ discharging into respectively cisterns A and B and tank C. Each steep tank has a circulating pipe for conducting the liquid from the bottom of the tank back to the top. This arrangement is shown in Fig. 2 in which tanks 11 and 12 are shown as provided with the circulating pipes $N^{11}$ and $N^{12}$ into which open the branch pipes $n^{11}$, $n^{12}$ from the bottom of the respective steeps. Pumps $O^{11}$, $O^{12}$ are interposed in the circulating pipes $N^{11}$, $N^{12}$ respectively. The circulating pipes are connected respectively with feeders L and M by the valved pipes $P^{11}$, $P^{12}$ respectively. It will be understood that similar arrangements exist with respect to the other steeps.

Q is a pipe fed by a pump R from change cisterns A and B, the pump having the two valve controlled inlets $r$ and $r'$ leading from the change cisterns respectively. The wash water from tank D enters change cistern B through a valved pipe $d$. A pump $c$ and $c'$ takes the liquid from the discharge tank C to the evaporators (not shown) or elsewhere, as may be desired. Pipe Q has the two branches S and T extending over the respective banks of steeps and discharging into the same through valved discharge pipes $s$, $s^3$, $s^5$, $s^7$, $s^9$, $s^{11}$, and $t^2$, $t^4$, $t^6$, $t^8$, $t^{10}$, $t^{12}$, respectively.

The temperature of the steeps is maintained at the desired point by the introduction of steam (from a source not shown) into the circulating pipes designated, in the case of steeps 11 and 12 shown in Fig. 2, $U^{11}$ and $U^{12}$, respectively. The other steeps are similarly supplied with steam. The steeps have the valve controlled grain discharges as, for example, the discharge spouts $V^{11}$, $V^{12}$ controlled by valves $v^{11}$, $v^{12}$, as shown in Fig. 2.

It will be understood that if desired the apparatus might consist of a larger number of banks of steeps than the two shown; and furthermore, that if desired, the entire battery might be operated serially instead of being divided into banks. The number of tanks will of course depend upon the amount of the material to be treated at any one time.

With the apparatus constructed and arranged as above described the various manipulations necessary for carrying out the operation of steeping grain may be described as performed in cycles. In each cycle the corn in one steep of each bank finishes its steeping operation and such steep is cut out of the system ready for grinding and another steep previously cut out is filled with corn and added to the system. In each cycle the steep liquid in each steep tank is shifted to the next tank of its series or bank. Therefore with the given battery of twelve steeps arranged in two banks as shown, the various operations constituting a given cycle may be performed in ten periods divided into two half cycles of five periods each. During the first half cycle the steep water is changed on one bank of steeps. It is changed on the other during the following half cycle.

Assuming that the operation has been carried on for sufficient time to bring the whole battery of steeps into operation, the description of the several operations making up one cycle may be commenced with the steeps in the following condition: 1 has just finished steeping, the steep water has been withdrawn and the corn therein is ready to go to the mills. 12 is just ground out. 2 has been steeping for the longest period and will be next to grind. 3 contains the next oldest corn and is drained out ready for fresh sulfur water (a dilute solution of sulfurous acid) or other suitable steeping liquid. The rest of the tanks are filled with steep water of progressively increasing density.

The operations performed in the cycle which comes next are as follows:

*First half cycle.*—Corn is removed from steep tank 1 going to the mills. At some time during the half cycle tank 3 receives fresh sulfur water from one or other of tanks E and F through pipe J and branch pipe $j^3$. Tanks 5, 7, 9 and 11 stand filled with bodies of steep water which are not changed during this half cycle. Separate circulations may, however, be maintained through these steeps during this interval and also through all of the other steeps during all of the intervals in which they are filled with the steeping liquid. If the corn in 1 is to be washed before going to the mills fresh water is pumped onto it from the cistern B filled, as shown, from tank D. This can be done at any convenient time during the half cycle or the latter part of the previous cycle. The water may be drained off, at a convenient time, into tank C and thence removed.

*First period.*—Steep 12, which was empty at the beginning of the cycle, is filled with fresh corn in any suitable manner. 10 drains to tank C. 10 contains the freshest corn in the second bank and the oldest steep water which is then withdrawn from the system to the evaporators. The steep liquor in 8 goes to change cistern A. 8 contains the next freshest corn and the next oldest steep water. Steeps 6, 4 and 2 are unchanged.

*Second period.*—The steep liquid in A—just received from 8—goes to tank 12 which is filled, or has just been filled, with fresh corn. The steep water in 6 goes to B, the other change cistern. Steeps 4 and 2 are filled with steep water which is unchanged. 10 and 8 stand without any liquid in them.

*Third period.*—The steep water in B—just filled from 6—goes to steep 10. The steep water in 4 goes to A. 2 and 12 steep without change. 8 and 6 stand emptied of liquid.

*Fourth period.*—The steep water in A—just filled from 4—goes to steep 8. The liquid in 2 goes to B. 12 and 10 steep without change. 4 and 6 stand emptied of liquid.

*Fifth period.*—The steep water in B—just filled from 2—goes to 6. 12, 10 and 8 steep without change. 2 is ready to grind out. 4 is emptied of its steep liquid and stands ready for fresh sulfur water during the first half of the next cycle.

It will be seen that during the above described first half cycle the steep liquid is shifted from each one of the tanks of the second bank to the second succeeding tank. The grain longest steeped is cut out of the system ready for grinding, the oldest batch of steep water withdrawn from the system, and the next oldest batch put on the fresh batch of grain.

*Second half cycle.*—The grain in steep 2 goes to the mills—after first having been washed with fresh water as above described in connection with steep 1 when this operation is necessary—4 receives fresh sulfur water from tank E or F. Tanks 12, 10, 8 and 6 steep without change during the entire half cycle.

*Sixth period.*—1 is filled with corn—just as 12 was filled during the previous half cycle—11 drains to the discharge tank C. 11 contains the freshest grain in bank 1 and the oldest steep water. The steep water in 9 goes to cistern A. 9 contains the next oldest steep water and the next freshest grain in the first bank. 7, 5 and 3 steep without change.

*Seventh period.*—The steep water in A—just filled from 9—goes to 1 which is filling, or has just been filled, with fresh grain. The steep water in 7 goes to B. 5 and 3 steep without change. 11 and 9 stand emptied of liquid.

*Eighth period.*—Steep water in B—just filled from 7—goes to 11. The steep water in 5 goes to A. 3 and 1 steep without change. 9 and 7 stand empty of liquid.

*Ninth period.*—The steep water in A—just filled from 5—goes to 9. Steep water in 3 goes to B. 1 and 11 steep without change. 7 and 5 stand emptied of liquid.

*Tenth period.*—Steep water in B—just filled from 3—goes to 7. 1, 11 and 9 steep without change. 5 stands ready for fresh sulfur water which it will receive during the next half cycle, and 3 is ready to grind out during the next half cycle.

It will be seen that in the second half cycle, above described, the steep water on each of the tanks of the first bank is changed to the second succeeding tank; that the tank containing the oldest grain is cut out ready for grinding; that the most concentrated batch of steep water is withdrawn from the system; and that the next oldest batch of steep water is put on a body of fresh grain.

The steeping may be continued by cycles of operations corresponding to that above described. There is always one steep which is cut out of the system for grinding and one which is out for the purpose of filling. The steeping proceeds in the rest of the steeps except for short periods of time necessary for making the shift of liquor from one to the next.

While I have shown a preferred construction and arrangement of the instrumentalities constituting my apparatus it will be obvious that some modification might be made therein without departure from the invention. Therefore I do not limit myself to the particulars shown and described except so far as certain of the same are made limitations on certain of the claims herein. I do not claim the process of steeping herein disclosed as this is made the subject matter of a co-pending application Serial No. 606,893 filed February 6, 1911.

I claim:

1. In apparatus of the character described, the combination with a plurality of steep tanks, of two change cisterns, means for withdrawing the liquid from any of the steep tanks and introducing it into either one of said cisterns and means, operable at the same time, for returning liquid from the other cistern to any other tank of said series.

2. In apparatus of the character described, the combination with a plurality of steep tanks, of two change cisterns, a conduit leading to said change cisterns and having branches leading out of said tanks, and a conduit leading from the change cisterns and having branches to said several steep tanks.

3. In apparatus of the character described, the combination with a plurality of steep tanks, of two change cisterns, a conduit leading to said change cisterns and having branches leading out of said tanks, a conduit leading from the change cisterns and having branches to said several steep tanks, and a conduit having branches to each of said tanks adapted to supply the same, as may be desired, with fresh liquid.

4. In apparatus of the character described, the combination with a plurality of steep tanks, of two change cisterns, a discharge tank, a conduit leading to said change cisterns and to said discharge tank, and having branches leading out of said steep tanks, and a conduit leading from the change cisterns and having branches to said several steep tanks.

5. In apparatus of the character described, the combination with a plurality of steep tanks, of two change cisterns, a conduit leading to said change cisterns and having branches leading out of said tanks, a conduit leading from the change cisterns and having branches to said several steep tanks, and means comprising a conduit leading from the bottom of each of said steep tanks to the top thereof for maintaining separate circulations through said tanks individually.

6. In apparatus of the character described, the combination with a battery of steep tanks divided into a plurality of banks, of means for withdrawing liquid from any of the tanks in each of said banks and introducing the same into any other tank of said bank, means for withdrawing the concentrated liquid from said battery out of any tank, and means for introducing fresh steep liquid into any tank thereof.

7. In apparatus of the character described, the combination with a battery of steep tanks divided into two banks, of two change cisterns, a discharge tank, feeders extending one under each bank of steep tanks and being connected respectively with the several steep tanks of said bank, a discharge pipe connected with said feeders and provided with nozzles adapted to discharge into the change cisterns and discharge tank, a pipe provided with branches leading from said change cisterns respectively and with branches extending over said banks of steeps and adapted respectively to discharge into the several steeps of said banks, a steep water pipe provided with branches leading to said several steeps, and means comprising a pipe leading from the bottom of each of the steeps into the top thereof for maintaining separate circulations through said steeps individually.

8. In apparatus of the character described, the combination with a plurality of steep tanks, of a source of supply of washing liquid, a conduit leading from said source of supply, means for connecting said conduit separately with said tanks, a plurality of change cisterns, a conduit adapted to discharge into any of said cisterns as may be desired, means for connecting the tanks separately with said last mentioned conduit, another conduit adapted to conduct the liquor from any of said cisterns as may be desired, and means for connecting the same separately with said steep tanks.

FREDRICK LESTER JEFFERIES.

Witnesses:
F. M. SAYRE,
A. N. HOMAN.